United States Patent
Andersen et al.

(10) Patent No.: US 6,483,999 B1
(45) Date of Patent: Nov. 19, 2002

(54) AUTOMATIC INTERRUPT FOR IMAGE FORMING DEVICES

(75) Inventors: Eric L. Andersen, Meridian, ID (US); Paul K. Mui, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 48 days.

(21) Appl. No.: 09/710,135

(22) Filed: Nov. 8, 2000

(51) Int. Cl.⁷ .............................. G03G 15/00
(52) U.S. Cl. ...................................... 399/87
(58) Field of Search ...................... 399/87, 85, 82, 399/81, 139, 38; 358/401, 296

(56) References Cited

U.S. PATENT DOCUMENTS

| 4,273,439 A | 6/1981 | Markham et al. ............ 399/87 |
| 4,344,697 A | 8/1982 | Matsumoto et al. .......... 399/85 |
| 4,563,706 A | 1/1986 | Nagashima ................. 358/444 |
| 4,673,990 A | 6/1987 | Okada ...................... 358/296 |
| 4,947,345 A | 8/1990 | Paradise et al. ............ 358/442 |
| 5,164,842 A | 11/1992 | Gauronski et al. ........... 358/401 |
| 5,206,735 A | 4/1993 | Gauronski et al. ........... 358/296 |
| 5,361,134 A | 11/1994 | Hu et al. .................... 358/296 |
| 5,384,633 A | * 1/1995 | Boyd ........................... 399/87 |
| 6,011,940 A | * 1/2000 | Van Lydegraf ............... 399/87 |
| 6,026,258 A | * 2/2000 | Fresk et al. .................. 399/87 |

* cited by examiner

Primary Examiner—Sophia S. Chen
(74) Attorney, Agent, or Firm—Leslie G. Murray

(57) ABSTRACT

A combination printer/copier which utilizes the page sensor in the document feeder and/or the lid to trigger an interrupt sequence. The interrupt sequence queries the user for the interrupt copy job parameters. Once these parameters are entered, or the user accepts the default settings and initiates the interrupt copy job by depression of a single button, the interrupt sequence compares the interrupt copy parameters with the current job status and current job parameters to evaluate the current job for a possible stopping point. If possible, the current job is then stopped at this point and the current job status, as well as print parameters, are stored for retrieval after the interrupt job is completed. The interrupt job is then processed. Once the interrupt job is completed, the prior job status and print parameters are retrieved and the interrupted job is resumed.

14 Claims, 3 Drawing Sheets

AUTOMATIC INTERRUPT FOR IMAGE FORMING DEVICES

FIELD OF THE INVENTION

The present invention generally relates to multi-function image forming devices. More particularly, the present invention relates to a combination computer printing and copying device which includes an automatic job interrupt for copying.

BACKGROUND OF THE INVENTION

In the current document production environment, there is a continuing convergence of copier and printer capabilities. On the copier side, digital copiers led to the inclusion of personal computer interfaces to allow the copiers to print electronic documents generated by an outside source such as a personal computer. On the personal computer printer side, digital scanner technology and more efficient electronic image processing and storage led printers to include copying capabilities. Unfortunately, neither single device can simultaneously handle both copying and printing as both functions are competing for the same hardware resources. Additionally, some copying features conflict with some printer features, and visa versa.

Typically, these types of devices are network printers serving a large number of network users. It is not uncommon at all for a user wanting to make a copy to walk up to the machine to find a large print job in process and several jobs in the queue, with no way to even identify the individual who sent the print job to request a pause or termination of the job. If the copier user proceeds to terminate the job, the printing user will not find out until sometime later that his print job was never completed.

To date, all combination devices require user intervention to interrupt the current copy or print job by depressing a control button on the device to pause the current job and pressing one or more control buttons to initiate a higher priority copy job.

U.S. Pat. No. 4,907,031 teaches a document copier which includes a copy job interrupt key for ceasing a first copy job at a point from which copying can be resumed later, storing the copy parameters to finish the first copy job later, starting a second copy job and finishing the first copy job upon completion of the second copy job. An interrupting user depresses the "I/R" key to stop the current job, enters in the desired number of copies, if greater than one, and depresses the "copy" key to commence the second job. Upon completion of the second job, the first copy job parameters are retrieved from memory and the first job is completed.

U.S. Pat. No. 4,273,439 teaches a document copier having multiple document feeders and allowing a user to select between the feeders during the copy process to suspend one job in favor of another. The copy parameters of both jobs are analyzed to decide whether to suspend one job in favor of another. To commence a second copy job, a user must depress the suspending/commencing mode button and enter in the copy parameters of the second job. Copying of the first job continues until the second parameters are entered and the document sensor in the second feeder indicates that the second document is present. Once both of these conditions are met, the copier compares the first jobs status and copy parameters to the parameters of the second job to determine whether to suspend the first in favor of the second. Once either job is completed the other is then finished.

U.S. Pat. No. 4,344,697 teaches a simple document copier having an interrupt button to interrupt a current multi-page copy job after the current page is finished, allow a second job to be processed and return to the first job, after a preset elapsed time period, upon finishing the second job.

U.S. Pat. No. 4,563,706 teaches a combination personal computer, printer and document copier which includes a copy interrupt or stop command entered at the control panel or the computer keyboard. No provision is made for automatic resumption of an interrupted job, nor automatic detection of a priority copy job.

U.S. Pat. No. 4,673,990 teaches a printer having a controlled interrupt feature which continues to accept print data until the current page is completed or the memory is full, thereby allowing a minor printer error to be corrected without causing job failure.

U.S. Pat. No. 4,947,345 teaches a queue management system for a combination print, copy and facsimile machine. The queue management system prioritizes the printing of jobs on a first-in, first-out (FIFO) basis, a fax job hold basis in which only copy and print jobs are printed, or on a fax priority basis releasing all held fax jobs for printing. The queue management system does not deal with multi-page jobs on an individual page basis, only on a job basis. Hence, if a job is interrupted or stopped, the current page is finished and the remainder of the job is deleted.

U.S. Pat. No. 5,164,842 teaches a high end document copier which includes a job interrupt to allow copying of a "proof" job prior to final copying. This is desirable copy if settings need to be adjusted prior to copying a large number of copies such as a book. The copier inserts the proof job into the output image queue at the earliest convenient spot ahead of all other non-proof copy jobs and before the next set in the current copy job. All jobs are electronic images of their hard copy counterparts, stored in memory.

U.S. Pat. No. 5,206,735 is similar to U.S. Pat. No. 5,164,842. The '735 patent teaches a high end document copier which includes a job interrupt to allow copying of a priority job prior to finishing the other jobs in the queue. The copier inserts the priority job into the output image queue at the earliest convenient spot ahead of all other standard copy jobs and before the next set in the current copy job. All jobs are electronic images of their hard copy counterparts, stored in memory.

U.S. Pat. No. 5,361,134 teaches a multi-functional document processing system for copying, printing, scanning and faxing of documents. This patent does not teach any job interrupt or prioritizing capabilities.

What is needed is a combination copier and printer which automatically detects the insertion of a document into the document feeder or upon the copying platform, interrupts the current job at the first possible resumption point, stores the current job status and parameters, places the device in copy ready mode, allows copying and resumes the original job upon completion of the interrupt copy job.

SUMMARY OF THE INVENTION

One embodiment of the invention satisfies the forgoing need by a combination printer/copier which utilizes the page sensor in the document feeder and/or the lid to trigger an interrupt sequence. The interrupt sequence may begin by displaying the current job status on a display such as the printer control panel to provide user feedback such as the number of pages remaining in the current job, approximate time left, etc. thereby allowing the user to cancel the interrupt job or simply wait until it is finished. Next, the interrupt sequence queries the user, for example through the display on the control panel, for the interrupt copy job parameters. Once these parameters are entered or the user accepts the default settings and initiates the interrupt copy job, the interrupt sequence compares the interrupt copy parameters with the current job status and current job parameters to evaluate the current job for a possible stopping point, that is to say a point from which the current job can be resumed. If possible, the current job is then stopped at this point and the current job status, as well as print parameters, are stored for retrieval after the interrupt job is completed. At this point, additional feedback may be provided to the user to eliminate a conflict such as clearing an output tray to prevent mixing of two jobs or changing the media supply source. The interrupt sequence may also allow the user to cancel the interrupt job at this point or simply automatically cancel the interrupt job and continue with the current job if the conflict prevents automatic resumption of the current job. Assuming that there is no conflict or that the conflict has been remedied, the interrupt job is then processed. Once the interrupt job is completed, the prior job status and print parameters are retrieved and the interrupted job is resumed.

DETAILED DESCRIPTION OF THE INVENTION

Figure 1:
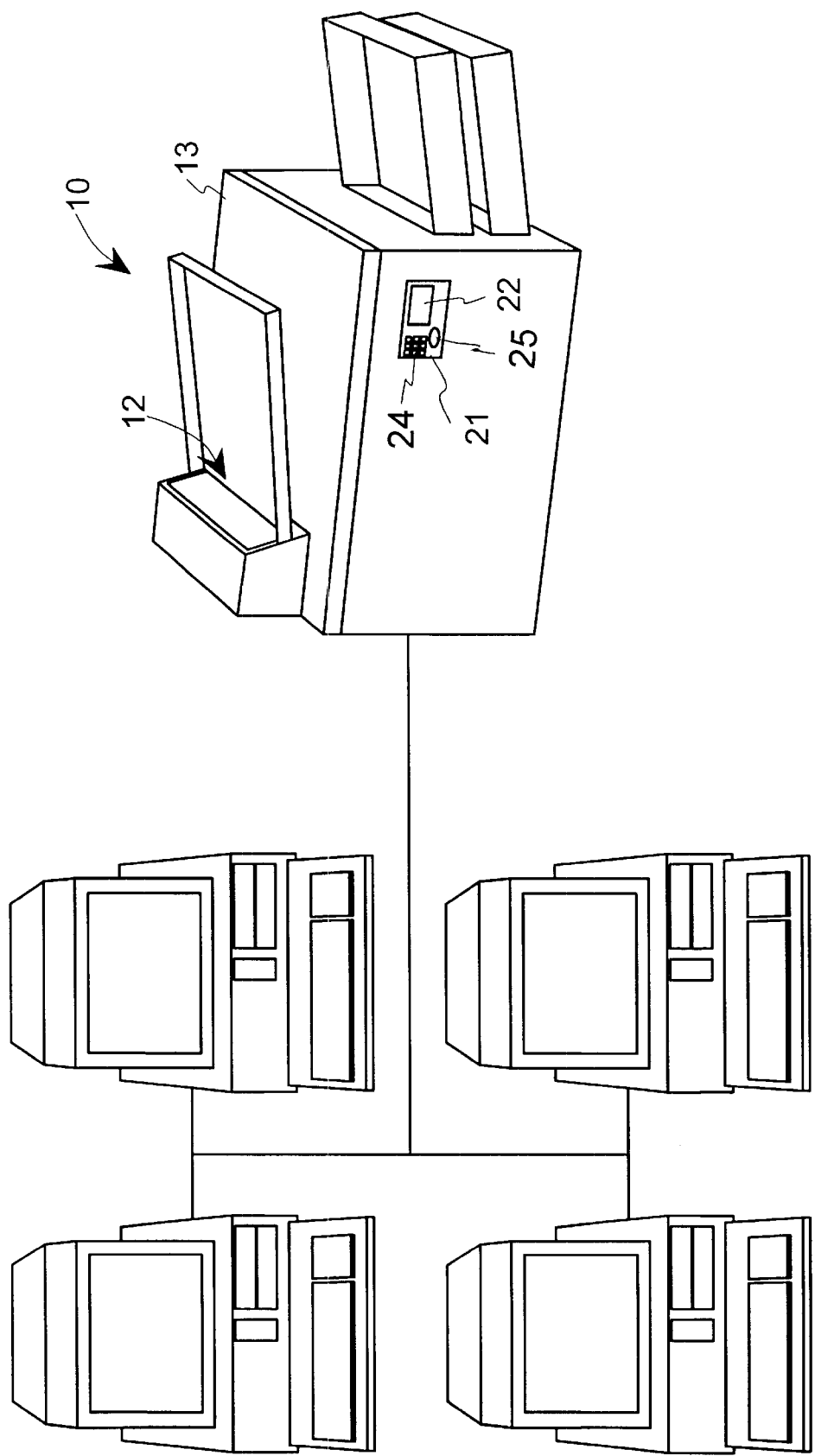
FIG. 1 is a block diagram of a network environment in which the invention may be implemented.
Figure 2:
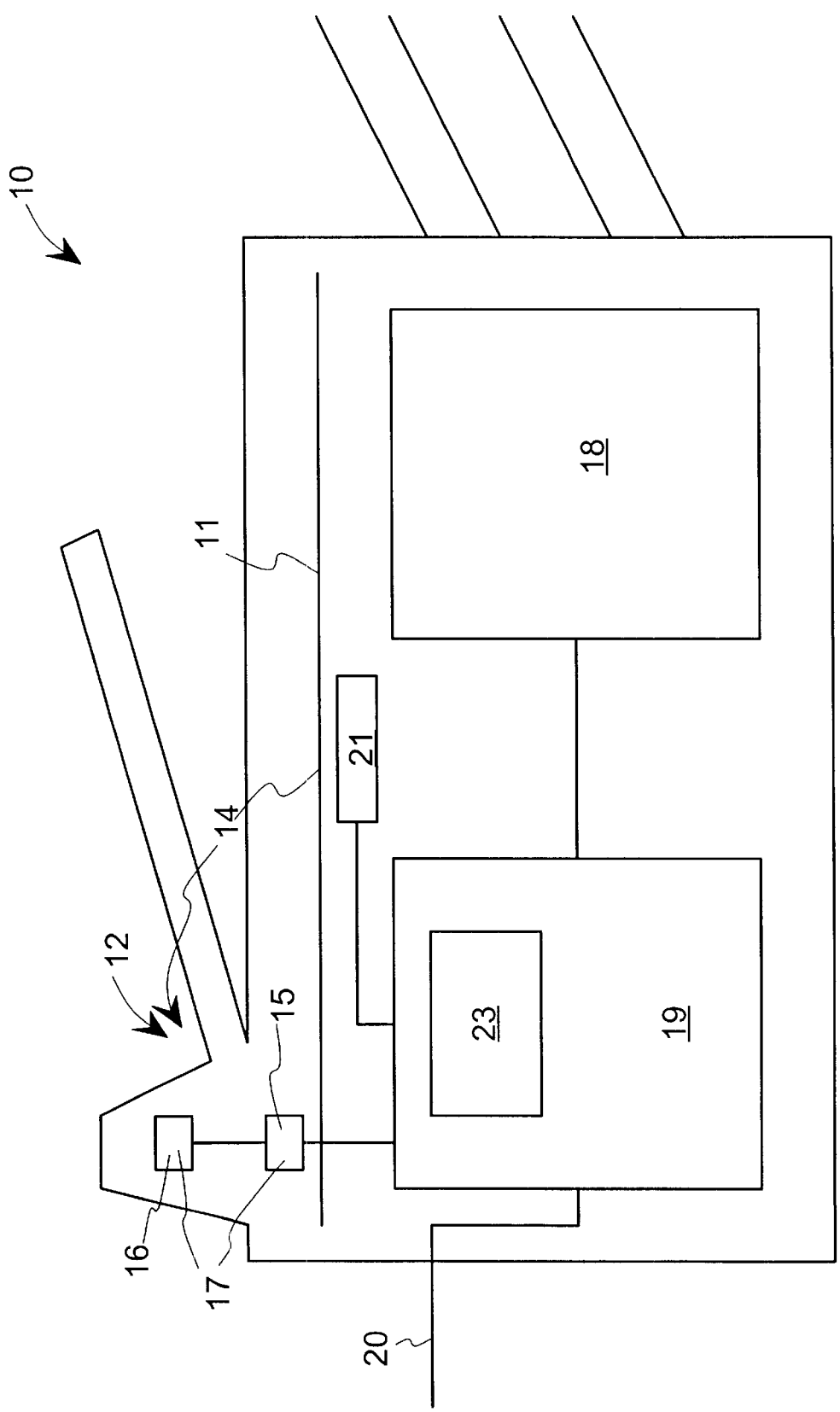
FIG. 2 is a block diagram schematic of an image forming device, here a laser printer, in which the invention may be implemented.

Referring now to FIGS. 1 and 2, a network environment including one or more host devices, such as a personal computer or workstation, for example, and at least one image forming device 10, here a laser printer, is shown. In a preferred embodiment, the image forming device 10 is equipped with copier functionality, including a flat bed scanner 11 having an automatic document feeder 12 in the lid 13. Flat bed scanner 11 and automatic document feeder 12 are herein generally referred to as original copy input 14. Lid 13 includes a lid activation sensor 15 which indicates whether lid 13 is open or closed. Automatic document feeder 12 includes a media sensor 16 which indicates the presence of media in automatic document feeder 12. Lid activation sensor 15 and media sensor 16 are herein generally referred to as original copy sensor 17. Laser printer 10 also includes a print engine 18, printer controller 19, electronic document input 20 and control panel 21, including a display 22. Controller 19 includes memory 23 which is preferably a fast non-volatile electronic memory, but may be a combination of random access memory (RAM) and a disk drive or simply just RAM. Printer 10 may also include various other options such as a duplexer, collator, packet stapler, binding stapler, multiple output bins, etc. While image forming device 10 has been described as a laser printer for illustration purposes, it should be noted that image forming device 10 may be any image forming device such as an inkjet or dot-matrix impact printer, for example.

Figure 3:
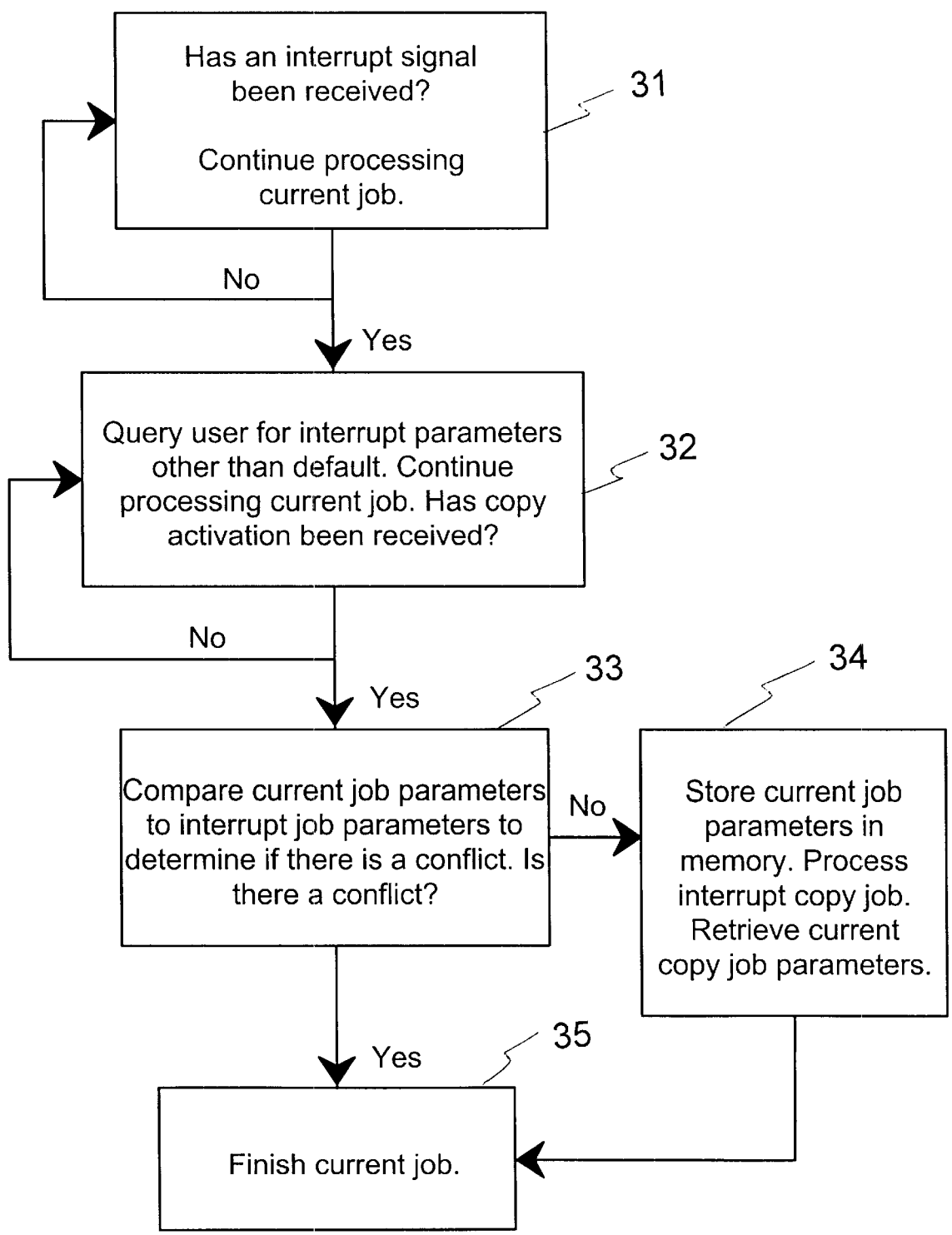
FIG. 3 is a flow diagram of one embodiment of the invention.

Referring now also to FIG. 3, according to the principles of the present invention the printer controller 19 utilizes media sensor 16 and/or lid sensor 15 to trigger (step 31) an interrupt sequence in a current print job, i.e. a print job either received through electronic document input 20 and/or retrieved from memory 23. In a preferred embodiment, the interrupt sequence may begin by displaying the current job status on display 22 to provide user feedback such as the number of pages remaining in the current job, approximate time left, etc. thereby allowing the user to cancel the interrupt job or simply wait until it is finished. Next, the interrupt sequence queries (step 32) the user, for example through display 22 on control panel 21, for user selectable parameters for the interrupt copy job. Once these parameters are entered, via keypad 24, for example, or the user accepts the default settings, the user initiates the interrupt copy job by depressing a single activation button, such as a copy button 25, for example, on control panel 21. The interrupt sequence then compares (step 33) the interrupt copy parameters with the current job status and current job parameters to evaluate the current job for a possible stopping point, that is to say a point from which the current job can be resumed. If possible, the current job is then stopped at this point and the current job status, as well as print parameters, are stored in memory 23 for retrieval after the interrupt job is completed (step 34).

At this point, additional feedback may be provided to the user to eliminate a conflict such as clearing an output tray to prevent mixing of two jobs or changing the media supply source. The interrupt sequence may also allow the user to cancel the interrupt job at this point or it may simply automatically cancel the interrupt job and continue (step 35) with the current job if the conflict prevents automatic resumption of the current job. Assuming that there is no conflict or that the conflict has been remedied, the interrupt job is then processed. Once the interrupt job is completed, the prior job status and print parameters are retrieved from memory 23 and the interrupted job is resumed (step 35).

While the present invention has been shown and described with reference to the foregoing embodiments, it is to be understood that other forms and alterations may be made thereto without departing from the spirit and scope of the invention. It should be understood, therefore, that the invention is to be construed broadly within the scope of the following claims.

What is claimed is:

1. An image forming device comprising:
    a housing having an original copy input and an electronic document input;
    an original copy sensor positioned to detect an original copy within the original copy input;
    a print engine positioned within the housing;
    a printer controller including memory, the printer controller being connected to the print engine and the original copy sensor and configured to initiate an interrupt sequence responsive to the original copy sensor, the interrupt sequence including a single button activation to initiate an interrupt copy job, stopping and storing parameters for a current job, copying the interrupt copy job, comparing interrupt copy job parameters to the current job parameters and automatic resumption of the current job upon completion of the interrupt copy job.

2. The image forming device of claim 1 wherein the original copy input includes an automatic document feeder and a media sensor forming at least a portion of the original copy sensor.

3. The image forming device of claim 2 further comprising a flat bed scanner comprising part of the original copy input, the flat bed scanner having a lid including a lid open sensor forming at least a portion of the original copy sensor.

4. The image forming device of claim 3 wherein the current job is an electronic document received through the electronic document input.

5. The image forming device of claim 1 wherein the current job is an electronic document received through the electronic document input.

6. The image forming device of claim 1 further comprising a display for displaying the current job status to a user.

7. The image forming device of claim 1 wherein the interrupt sequence queries a user for user selectable parameters applicable to the interrupt copy job.

8. The image forming device of claim 1 comprising an inkjet printer.

9. The image forming device of claim 1 comprising a laser printer.

10. The image forming device of claim 1 wherein the interrupt sequence determines if a conflict exists between the interrupt copy job and the current job.

11. The image forming device of claim 10 wherein the interrupt sequence, if a conflict does not exist between the interrupt copy job and the current job, processes the interrupt copy job and resumes the current job upon completion of the interrupt copy job, and, if a conflict exists between the interrupt copy job and the current job, continues processing the current job.

12. A method of processing an interrupt copy job on a combination printer and copier device comprising the steps of:
    sensing the presence of an interrupt copy original in an original copy input of the combination printer and copier device;
    obtaining interrupt copy job parameters;
    comparing the interrupt copy job parameters to any current job parameters to determine if a conflict exists;
    if a conflict does not exist, upon activation of a single button by a user stopping the current job, storing the current job parameters in memory, processing the interrupt copy job and resuming the current job upon completion of the interrupt copy job; and
    if a conflict exists, continue processing the current job.

13. The method of claim 12 wherein the step of obtaining interrupt copy job parameters includes querying a user for interrupt copy job parameters.

14. The method of claim 13 including the step of using a predetermined set of default settings in the event no interrupt job parameters are provided.

* * * * *